Jan. 24, 1956  R. L. MARTIN  2,732,140
COIL WINDER
Filed Feb. 2, 1953  2 Sheets-Sheet 1
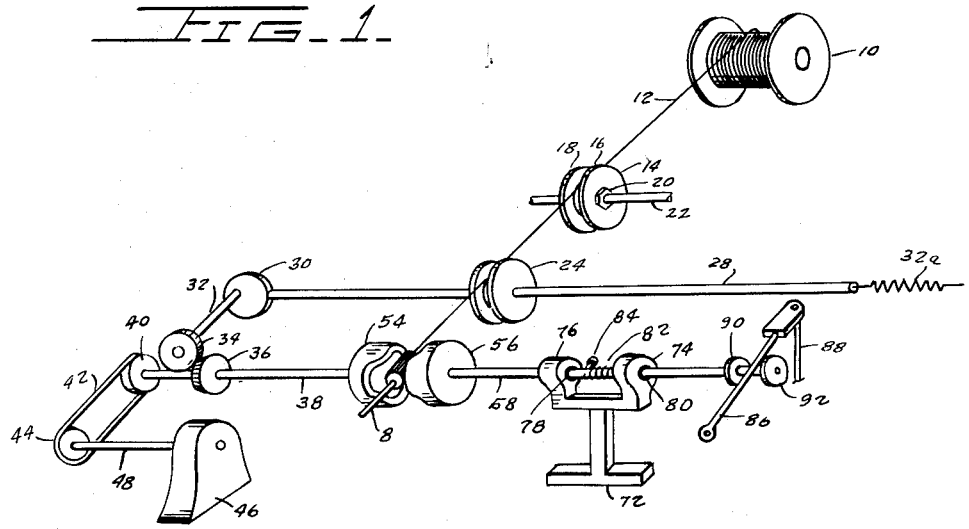
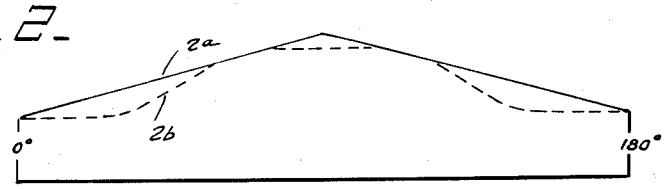
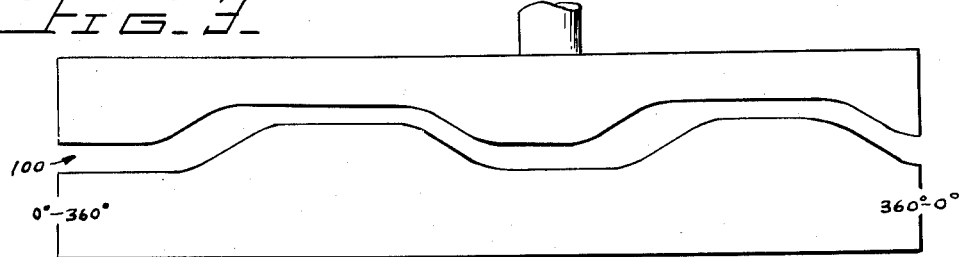
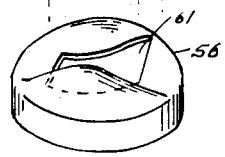
INVENTOR.
ROBERT LORING MARTIN
BY
ATTORNEYS Jan. 24, 1956   R. L. MARTIN   2,732,140
COIL WINDER
Filed Feb. 2, 1953   2 Sheets-Sheet 2
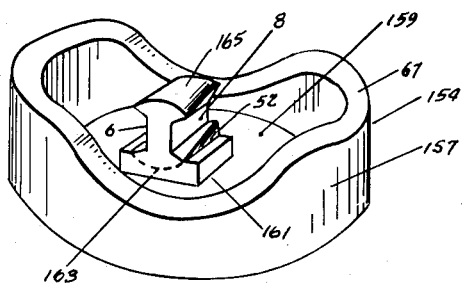
_FIG_6_
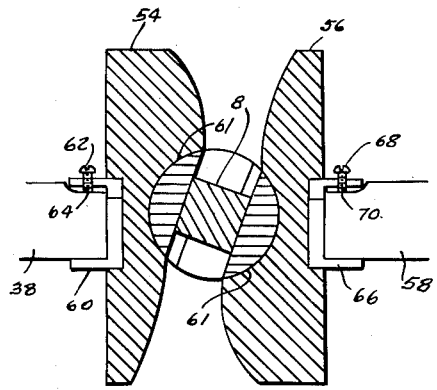
_FIG_7_
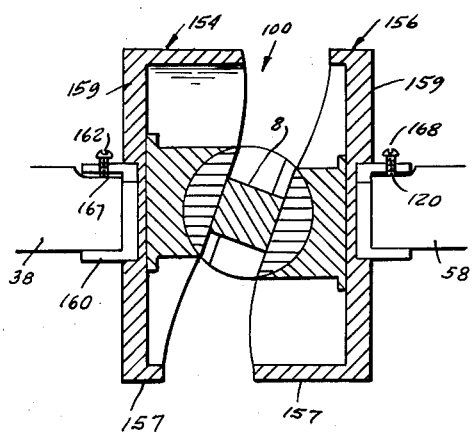
_FIG_8_
INVENTOR.
ROBERT LORING MARTIN
BY Ostrolenk & Faber
ATTORNEYS

United States Patent Office 2,732,140
Patented Jan. 24, 1956

2,732,140

COIL WINDER

Robert Loring Martin, Monterey Park, Calif., assignor to Standard Coil Products Co., Inc., Los Angeles, Calif., a corporation of Illinois Application February 2, 1953, Serial No. 334,460

3 Claims. (Cl. 242—13)

My present invention relates to coil winding machinery and more particularly to apparatus for winding a coil in the skewed slot of a motor armature.

In the design and operation of small motors, including motors adapted for operation as servo-mechanisms, it is at times found advantageous to wind the armature coil in a skewed slot, that is, in a slot extending generally longitudinally of the axis of the armature rotor but in a plane which intersects the axis.

In the winding of rotors, it was customary to support the rotor for rotation about an axis perpendicular to and intersecting the axis of the rotor; this was convenient since in prior rotors the coil receiving slots were parallel to the axis of the rotor. The wire was then taken from a supply bobbin, through appropriate tensioning means and an oscillating guide to the rotor slot and wound in the rotor slot by rotation of the rotor; the oscillating guide served to spread the wire appropriately in the slot.

Where, however, a rotor with a skewed slot is thus wound, conventional winding apparatus as above described wound tend to wind the wire, at least, irregularly in the slot and might result in pulling the wire from the slot. This is so because the path of winding of the wire in the slot is at an angle to the path of drawing of the wire from the supply.

My invention contemplates the use of conventional coil winding machinery for winding the coil in the slot of a rotor with a skewed slot wherein the winding machinery is provided with a cam support for the rotor, the edges of the cam defining a wire guide following generally the boundary of the slot, whereby the wire to be wound reaches the cam in a straight line and then is guided by the cam in another straight line to the portion of the slot which is at that instant being wound. Essentially, the cam which is in two parts on either side of the rotor, acts as a continuous funnel or guide causing the wire to enter the slot along a line substantially parallel to the sides of the slot irrespective of the skew of the slot.

The primary object of my invention, therefore, is the provision of novel coil winding apparatus for adapting conventional coil winding machinery to the winding of rotors having slots skewed in planes at an angle to the axis of the rotor.

Another object is the provision in coil winding machinery of a cam guide for guiding wire to the skewed slot of a rotor to be wound along a path substantially parallel to the sides of the slot to be wound.

The foregoing and other objects of my invention will become apparent in the following description and drawings in which:

Figure 1 illustrates schematically conventional coil winding machinery, including the cam edged rotor holders in accordance with the invention.

Figure 2 is a set of curves, curve 2a illustrating the curve produced by plotting the distance of the edge of the slot from a fixed point of reference against the angular rotation of the rotor; curve 2b showing a preferred cam curve approximating the optimum curve.

Figure 3 is a developed view of a path produced by the edges of a pair of the cam edged rotor holders rotated through 360°.

Figure 4 is a side view of a rotor with a skewed slot to be wound.

Figure 5 is a view in perspective of the rotor of Figure 4 mounted in one form of cam for winding according to my invention.

Figure 6 is a view in perspective of another form of cam supporting a rotor in accordance with my invention.

Figure 7 is a cross-sectional view showing the rotor of Figure 4 mounted between a pair of cams of the form of Figure 5 for winding in the apparatus of Figure 1.

Figure 8 is a cross-sectional view showing the rotor of Figure 4 mounted between a pair of cams of the form of Figure 6 for winding in the apparatus of Figure 1.

The coil winding machinery in which my novel winding cams are to be employed is shown schematically in Figure 1. A preliminary description of this apparatus will aid in a full understanding of the invention.

Wire 12 which is to form the coil in the slot of the rotor is led from supply bobbin 10 through tension pads 14 on shaft 22. Tension pads 14 are preferably felt-faced pads which may be adjustably tightened by lock nut 20, thereby providing appropriate tension on wire 12 to ensure the formation of a taut, even coil in the slot of the motor.

The wire 12 then passes between guides 24 comprising a pair of plates mounted on shaft 28 which is caused to oscillate longitudinally by cam 30 in timed relation to rotation of the rotor to be wound as hereinafter described. Compression spring 32a drives the shaft 28 against the cam so that it will follow the cam.

Cam 30 is driven by shaft 32 through bevel gear 34 and bevel gear 36 on main drive shaft 38. Drive shaft 38 is driven by pulley 40 and belt 42 from pulley 44 on drive shaft 48 of motor 46.

The rotor supports comprise cams 54 and 56. Cam 54 in Figures 5 and 7 is shown as having a contoured shape adapted to be made preferably of a moldable plastic. Since this conformation may be difficult to produce, I may make the cam as shown in Figures 1, 6 and 8.

Cams 54 and 56 (Figures 5 and 7) or 154 and 156 of Figures 1, 6 and 8, act together as shown and described to form the guide slot which acts as a continuous funnel to guide the wire into the skewed slot of the rotor.

Cam 54 has a sleeve 60 (Figure 7) extending from the flat non-operative side thereof. Sleeve 60 is fitted over the end of drive shaft 38 and held thereon by screw 62 engaging flat 64 of shaft 38.

Cam 56, of similar shape to cam 54, is attached to retractable shaft 58 by means of sleeve 66 and screw 68 on flat 70 of shaft 58. Shaft 58 is rotatable and longitudinally slidable in bearings 74, 76 on support 72. Compression spring 82 compressed between bearing 74 and pin 84 on shaft 58 drives the shaft 58 to the left so that cam 56 is driven toward cam 54.

Cams 54 and 56 capture and hold rotor 8 between them in the seats 61 of the cams so that the slot formed between cams 54 and 56 and the guide surfaces formed thereby are aligned with the slot in rotor 8 as indicated in Figure 7.

The handle 86 pivotally mounted on a shaft 88 is positioned between bushings 90 and 92 at the opposite end of the shaft 58 in such a manner that the shaft 58 may be moved to the right away from the rotor 8 against the spring action of the spring 82 in order to change or rotate the rotor 8. The rotor 8 is normally rigidly fixed between the cams 54 and 56.

Therefore, on moving the handle 86 from side to side the shaft 58 and the cam 56 may be moved in a longitudinal manner in order to load the rotor 8 between the cams. When the two cams 54 and 56 are engaged with the rotor 8 and the driving motor 42 is operated, the main driving shaft 38, the cams 54 and 56, the rotor 8 therebetween, and the retractable shaft 58 all rotate in an integrated manner.

Cams 54 and 56 are removably mounted on shafts 38 and 58, respectively, in order to accommodate different sizes and types of rotors. The cams 54 and 56, however, need not be adjustably mounted on the shafts 38 and 58 since the shafts 38 and 58 are separable. Shaft 58 may be rotated angularly in any way required in order to obtain a locking engagement of the rotor 8 between the cams 56 and 54; so that the adjustment of the cams with respect to each other is inherent in the construction of the machine.

The function of the oscillating wire guide 24 is to spread the coil properly and smoothly in the rotor slot 52. The oscillating guide 24 is adjustably mounted longitudinally on the shaft 28. Actually, as a matter of practice, a trial and error method is followed to obtain the optimum position of the oscillating guide 24 on the shaft 28 in order to get an even spread of the coil winding in the slot 6.

The bevel gears 34 and 36 are chosen to have a reduction ratio such that the cam 30 attached to shaft 32, which oscillates the shaft 28, will evenly space one layer of the coil across the width of the slot 6.

In summary, the coil winding machinery, which is conventional except for the cam holders 54 and 56, operates to rotate the rotor such that the axle of the rotor rotates in a plane perpendicular to the driving shafts 38 and the retractable shaft 58.

The reason for the cam edged structure of the cam holders 54 and 56 is that the rotor slot 52 is skewed. The cam holders 54 and 56 are curved as shown in Figures 4, 5 and 6 in order to follow the helical skew of the rotor slot or to put it in another way, the position and shape of the helical skew of the rotor slot determines the shape that the cam surface is to take. If there were no skew in the rotor slot 6 then the cam surface would not be needed.

Actually, in essence, what has been done is that the skewed slot in the rotor, regardless of how irregular it is, is projected out into a large rotating funnel, so to speak, which guides the wire into the slot in the proper manner.

It follows, therefore, that the shape taken by the cammed edges of the cam holders 54 and 56 is directly related to the type of skewed slots into which a coil is to be wound. One method of designing a cam holder for a particular skewed rotor is to plot a curve of the distance of the edge of the slot from a fixed point of reference as a function of the angular rotation of the rotor. A curve of this type appears at 2a of Figure 2 and corresponds to the rotor having a skewed slot of the type illustrated in Figure 4.

It can be seen that if the rotor is rotated 180° in a plane parallel to its axis, a shallow saw toothed curve will be developed such that the wire will be guided into the rotating skewed slot of the rotor. In accordance with the curve in Figure 2a, each portion of the loop would be parallel to the nearest edge of the slot. However, due to the operational limitations of winding machines and the difficulty of making sharp changes in direction, a curve is smoothed out to that of the type illustrated in curve 2b of Figure 2 in order to reduce wire breakage during the coil winding operation. The cam edges of the rotor holders are designed according to this type of curve.

The curve which may be adopted in the final design of the cam holders is illustrated in Figure 3, which shows the cammed path 100 produced by the two cams 54 and 56 in operational position and developed over 360°. The path 100 acts to guide or funnel the wire 12 on to the correct position in the skewed slot 6 of the rotor 8. The two cam edges are slightly different in order to hold the rotor 8 in position between the two cam holders to produce a mating effect.

In Figures 1, 6 and 8 I have shown modified forms 154, 156 of the cams 54 and 56. These members are mounted on shafts 38 and 58; and operate in the same manner as cams 54 and 56 and consequently have been given corresponding reference numerals.

The cams 154, 156 have cylindrical walls 157, the surface edges of which, at slot 100, are shaped as already described in connection with Figures 2 and 3 to follow the skewed slot 6 of rotor 8. The wire 12 is then guided by these surfaces; the only difference between cams 54 and 56 on the one hand and cams 154 and 156 on the other hand being that the wire in the latter is not supported by a solid surface between the cam edge at the entry of slot 100 and the rotor slot itself.

Actually, the cams 154, 156 of Figures 1, 6 and 7 lend themselves better to mass production for many different sizes. The essential element is that the wire 12 is led from the bobbin in substantially a line normal to the bobbin axis and that it enters the rotor slot in a line substantially parallel to the sides of the slot which it is entering at the moment. These essential conditions are fulfilled by both forms of cam.

In operation, it is necessary merely to operate handle 86 to the right to pull cam 156 or 56 away from cam 54 and release the wound rotor 8. A new rotor is placed between the cams, handle 86 is released and rotor 8 is seated between seats 61 of the cams; the cam 56 and the rotor being turned to ensure this seating. The winding operation may then be repeated.

In the foregoing, I have described my invention solely in connection with specific illustrative embodiments thereof. Since many variations and modifications of my invention will now be obvious to those skilled in the art, I prefer not to be bound by the specific disclosures herein contained but only by the appended claims.

I claim:

1. A winding machine for winding a coil of wire on a rotor having a wire receiving slot, the center line of which is at a skewed acute angle with respect to the axis of the rotor including means for mounting the rotor for rotation on an axis normal to the axis of the rotor; a source of supply for wire; means for guiding the wire into the slot as the rotor is rotated; said means comprising a pair of spaced rotatable guide cams mounted for rotation on the same axis as the rotor is rotated; said cams having surfaces at an angle to the axis of rotation of the cams; and surfaces combining to form a slot parallel to and coinciding substantially with the path of the skewed rotor slot and guiding the wire along a line substantially parallel at any instant to the center line of the slot, and means for guiding said wire to said slot intermediate said cams at a uniformly moving rate in a direction parallel to the rotary axis of said cams.

2. A winding machine for winding a coil of wire on a rotor having a wire receiving slot, the center line of which is at a skewed acute angle with respect to the axis of the rotor including means for mounting the rotor for rotation on an axis normal to the axis of the rotor; a source of supply for wire; means for guiding the wire into the slot as the rotor is rotated; said means comprising a pair of spaced rotatable guide cams mounted for rotation on the same axis as the rotor is rotated; said cams having surfaces at an angle to the axis of rotation of the cams; said surfaces combining to form a slot parallel to and coinciding substantially with the path of the skewed rotor slot and guiding the wire along a line substantially parallel at any instant to the center line of the slot, each cam having a recess receiving the rotor, the matching recesses combining to support the rotor, one of said cams being releasably biased toward the other to maintain the rotor in supported position, and means for guiding said wire to said slot intermediate said cams at a uniformly moving rate in a direction parallel to the rotary axis of said cams.

3. A winding machine for winding a coil of wire on a rotor having a wire receiving slot, the center line of which extends in a plane which intersects the axis of the rotor at an acute angle including means for mounting the rotor for rotation on an axis normal to the axis of the rotor; a source of supply for wire; means for guiding the wire into the slot as the rotor is rotated; said means comprising a pair of spaced rotatable guide cams mounted for rotation on the same axis as the rotor is rotated; said cams having surfaces at an angle to the axis of rotation of the cams; said surfaces combining to form a slot coinciding substantially with the path of the rotor slot and guiding the wire along a line substantially parallel at any instant to the center line of the slot, each cam having a recess receiving the rotor, the matching recesses combining to support the rotor, each cam comprising a cylindrical member rotatable on its axis; the edge of the wall of the cylinder being shaped to correspond to the location of the rotor slot and combining with the edge of the wall of the other cam to form a circular slot registering with the rotor slot, and means for guiding said wire to said slot intermediate said cams at a uniformly moving rate in a direction parallel to the rotary axis of said cams.

References Cited in the file of this patent

UNITED STATES PATENTS

| | | |
|---|---|---|
| 1,661,331 | Gomory | Mar. 6, 1928 |
| 1,865,461 | Emmert | July 5, 1932 |
| 2,348,948 | Allen | May 16, 1944 |
| 2,394,529 | Arpurth | Feb. 12, 1946 |